Patented May 4, 1948

2,440,929

UNITED STATES PATENT OFFICE 2,440,929

PRODUCTION OF 1:5-PENTANEDIOL

John George Mackay Bremner and Frederick Starkey, Norton-on-Tees, England, assignors to Imperial Chemical Industries Limited, a corporation of Great Britain No Drawing. Application June 5, 1946, Serial No. 674,658. In Great Britain May 25, 1945

10 Claims. (Cl. 260—635)

This invention relates to the production of 1,5-pentanediol.

According to the present invention there is provided a process for the production of 1,5-pentanediol which comprises reacting 2,3-dihydropyran in the liquid phase with water and hydrogen at elevated temperature and pressure in the presence of a hydrogenating catalyst.

Pressures of at least 30 atmospheres gauge and temperatures of at least 150° C. may be employed. However, pressures of at least 50 atmospheres gauge and temperatures in excess of 200° C. are desirable. The preferred reaction conditions are 250-275° C. and a pressure of at least 50 atmospheres gauge, e. g. 230-250 atmospheres gauge. It is undesirable to employ temperatures much above 400° C. The stoichiometric proportion of water relative to 2,3-dihydropyran may be employed, but it is preferred to employ a proportion greater than this for example up to about 4 times that of the 2,3-dihydropyran by weight. The process may be operated batchwise or continuously.

The preferred hydrogenating catalysts are the following: copper containing catalysts, for example copper chromite such as copper barium chromite, and copper potassium chromite, foraminate copper aluminium, alloy skeletal copper known as Raney copper, and fused copper catalyst in substantially metallic form, prepared by reducing fused copper oxide. Under the preferred reaction conditions as specified above all of these give yields of over 60%, and some e. g. foraminate copper aluminium and copper barium chromite give as much as 90%. Other catalysts suitable for use in the process but which are not, however, so effective comprise nickel on kieselguhr (30% nickel for example), nickel chromite, aluminium chromite (15% Al) copper supported on kieselguhr, copper supported on titania, and silver or beryllium containing catalysts, e. g. beryllium chromite, silver chromite.

Certain of these may be alkalised, i. e. treated or promoted with alkali, e. g. the foraminate copper aluminium and the copper barium chromite catalysts. The foraminate copper aluminium catalysts are the most suitable for continuous operation since they withstand the passage of liquid over or through them without substantial disintegration.

The foraminate copper catalysts are of the type described in co-pending application Serial No. 706,809, filed October 30, 1946. The copper chromite catalysts with or without the addition of barium or potassium may be prepared for example as described in Organic Syntheses, Collective Volume II (1943), pages 142-145. The aluminium chromite catalysts may be prepared in the manner described in British specification Nos. 570,551 and 570,556.

A nickel chromite catalyst may be prepared for example by adding ammonia liquor to a solution of nickel nitrate and chromium trioxide warmed to 80° C., in which the concentration of each is one fifth molar, until no further precipitate is formed. The precipitate is filtered off and dried at 120° C. The dry cake is carefully decomposed at 350° C. and then calcined at 350° C. for 3 hours. The product, which has the composition

$NiO.Cr_2O_3$ is pelleted and is activated by reduction with hydrogen at about 400° C.

The nickel-on-kieselguhr catalyst is prepared for example by adding kieselguhr to a 1-molar solution of nickel nitrate in such proportion that the fully reduced catalyst as described hereunder contains about 37% nickel as metal. To the mixture at 60° C. there is added a 20% solution of sodium carbonate in an amount corresponding to one and one half times that required theoretically to precipitate nickel carbonate. The slurry is filtered, washed until its sodium content is not more than 0.1%, and is then dried. The catalyst is activated by reducing with hydrogen at about 400° C.

A beryllium chromite catalyst is prepared for example by adding ammonia to a solution at room temperature containing beryllium nitrate and ammonium dichromate, in molar and half-molar concentrations respectively, until precipitation is complete. The precipitate is filtered and dried at 120° C., and the dry product is decomposed at 300° C. and finally ignited at 500° C. for 2 hours. The catalyst is activated by reduction with hydrogen at about 300° C.

A silver chromite catalyst is prepared for example by adding ammonia liquor to a solution of silver and chromium nitrates in which the concentration of each is twice molar until precipitation is complete. The paste is dried at 120° C., decomposed and finally calcined at 300° C. for 4 hours. The catalyst is activated by reduction with hydrogen at 300° C. for about 1 hour.

A copper on kieselguhr catalyst is prepared for example by making a slurry of kieselguhr and a half molar solution of copper nitrate, taken in proportions such that the prepared reduced catalyst contains 20% by weight of copper. To this mixture at room temperature there is added a 12.5% solution of sodium carbonate until precipitation is complete. The filtered product is washed until substantially free from sodium and is dried at 120° C. The catalyst is activated by reduction with hydrogen for 1 hour at 300° C.

A copper on titania catalyst is prepared by first producing a titania gel by adding ammonia liquor to a solution of titanium tetrachloride containing 43 gms. of the anhydrous salt per 100 mls., filtering the precipitate off and washing free from chloride. The filter cake so obtained is then slurried in a molar solution of copper nitrate employing proportions of each which will give a fully reduced catalyst containing about 20% copper. The copper is then precipitated by adding a 12% solution of sodium carbonate at room temperature until precipitation is complete. The filtered product is washed substantially free from nitrate, dried and calcined at 400° C. for about 4 hours. The catalyst is activated by reduction with hydrogen at about 300° C.

When the process is operated continuously it is preferred to feed the dihydropyran and water, for example as an emulsion, to a preheater in order to bring them to the reaction temperature and then to introduce them into the reaction zone. Preferably also the convertor is packed with catalyst on the spaced bed principle, that is with alternate layers of catalyst and an inert material serving to dissipate heat, for example silica chips or fish spine beads.

The invention is illustrated but not limited by the following examples in which the parts are by weight unless otherwise stated.

Example 1

400 gms. of dihydropyran, 100 gms. of water and 40 gms. of granular foraminate copper catalyst were charged to a 1 litre autoclave comprising a chrome steel tube which could be heated electrically. The autoclave was sealed and purged from air by means of nitrogen, and hydrogen was introduced at room temperature until the pressure was 100 atmospheres gauge. The heaters were then switched on and the temperature was raised to 200° C. and the pressure to about 200 atmospheres gauge. Absorption of hydrogen commenced markedly at about 200° C. and the pressure was then allowed to fall to 150 atmospheres gauge. The reaction was continued at a temperature of 200° C. and a pressure of 225–250 atmospheres gauge for about 6 hours, when absorption of hydrogen ceased. The autoclave was cooled and discharged, and the product was freed from catalyst and distilled. There was obtained a yield of 1,5-pentanediol amounting to about 90% of theoretical.

Example 2

400 gms. of dihydropyran, 100 gms. of water and 40 gms. of copper barium chromite catalyst were charged to the autoclave described in Example 1 and the process was carried out in the same way employing similar temperatures and pressures. Absorption of hydrogen ceased after 6 hours. On distillation of the filtered product there was obtained a yield of 1,5-pentanediol amounting to about 80% of theoretical.

Example 3

400 gms. of dihydropyran, 100 gms. of water and 40 gms. of activated Raney copper powder were charged to the autoclave described in Example 1, and the same procedure and similar temperatures and pressures were employed. After operating for 6 hours at temperature the absorption of hydrogen had ceased. On distillation of the filtered product there was obtained a yield of 1,5-pentanediol amounting to about 85% of theoretical.

Example 4

An emulsion comprising 4 parts of dihydropyran dispersed in 1 part of water by weight by means of Turkey-red oil was fed continuously to a preheater under a pressure of 250 atmospheres gauge of hydrogen and thence to a packed converter at 200° C. at a liquid space velocity of 0.3 hours$^{-1}$ of dihydropyran. The converter, which was 10' long x 2" diameter, was of chrome steel and electrically heated, and was packed with ¼" foraminate copper granules, there being alternate beds of catalyst and silica chips of which the total volumes were 4 litres and 2 litres respectively. The exit gas rate was 5 cu. metres per hour. On distillation of the product 1,5-pentanediol was obtained in 75% yield.

We claim:

1. A process for the production of 1,5-pentanediol which comprises reacting 2,3-dihydropyran in the liquid phase with water and hydrogen under at least 50 atmospheres gauge and a temperature of at least 200° C. in the presence of a copper containing hydrogenating catalyst.

2. A process for the production of 1,5-pentanediol which comprises reacting 2,3-dihydropyran in the liquid phase with water and hydrogen at a temperature of 250° to 275° C. and under a pressure of from 230 to 250 atmospheres gauge in the presence of a copper containing hydrogenating catalyst.

3. A process for the production of 1,5-pentanediol which comprises reacting 2,3-dihydropyran in the liquid phase with water and hydrogen at elevated temperature and pressure in the presence of a copper containing hydrogenating catalyst.

4. A process for the production of 1,5-pentanediol which comprises reacting 2,3-dihydropyran in the liquid phase with water and hydrogen at elevated temperature and pressure in the presence of a copper barium chromate hydrogenating catalyst.

5. A process for the production of 1,5-pentanediol which comprises continuously reacting dihydropyran in the liquid phase with water and hydrogen at elevated temperature and pressure in the presence of a copper containing hydrogenating catalyst.

6. A process for the production of 1,5-pentanediol which comprises continuously preheating dihydropyran and water, continuously feeding them together with hydrogen to a reaction zone containing a copper containing hydrogenating catalyst and there reacting them under elevated temperature and pressure.

7. A process for the production of 1,5-pentanediol which comprises continuously preheating dihydropyran and water in the presence of hydrogen under elevated temperature and pressure and continuously feeding them to a reaction zone containing a copper containing hydrogenating catalyst and there reacting them in the presence of hydrogen under elevated temperature and pressure.

8. A process for the production of 1,5-pentanediol which comprises continuously reacting 2,3-dihydropyran in the liquid phase with water and hydrogen at elevated temperature and pressure in the presence of a foraminate copper aluminium catalyst.

9. The process for the production of 1,5-pentanediol which comprises reacting 2,3-dihydropyran in aqueous emulsion with water and hydrogen under a pressure of at least 30 atmospheres gauge and a temperature of at least 200° C. in the presence of a copper containing hydrogenating catalyst.

10. The process for the production of 1,5-pentanediol which comprises reacting 2,3-dihydropyran in aqueous emulsion containing an emulsifying agent with water and hydrogen under a pressure of at least 30 atmospheres gauge and a temperature of at least 200° C. in the presence of a copper containing hydrogenating catalyst.

JOHN GEORGE MACKAY BREMNER.
FREDERICK STARKEY.

REFERENCES CITED

The following references are of record in the file of this patent:

UNITED STATES PATENTS

| Number | Name | Date |
|---|---|---|
| 2,097,493 | Leuck et al. | Nov. 2, 1937 |